(12) United States Patent
Nam et al.

(10) Patent No.: US 9,060,361 B2
(45) Date of Patent: Jun. 16, 2015

(54) METHOD AND APPARATUS FOR TRANSMITTING/RECEIVING CHANNEL STATE INFORMATION

(71) Applicant: Samsung Electronics Co., Ltd, Suwon-si, Gyeonggi-do (KR)

(72) Inventors: Young-Han Nam, Plano, TX (US); Boon Loong Ng, Dallas, TX (US); Hyojin Lee, Seoul (KR); Krishna Sayana, San Jose, CA (US); Himke van der Velde, Zwolle (NL); Jianzhong Zhang, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 78 days.

(21) Appl. No.: 14/036,924

(22) Filed: Sep. 25, 2013

(65) Prior Publication Data
US 2014/0086174 A1    Mar. 27, 2014

Related U.S. Application Data

(60) Provisional application No. 61/706,633, filed on Sep. 27, 2012, provisional application No. 61/720,860, filed on Oct. 31, 2012.

(51) Int. Cl.
H04W 72/04    (2009.01)
H04W 72/12    (2009.01)
H04L 5/00     (2006.01)
(Continued)

(52) U.S. Cl.
CPC .......... *H04W 72/0413* (2013.01); *H04W 24/10* (2013.01); *H04W 72/12* (2013.01); *H04L 5/001* (2013.01); *H04L 5/0057* (2013.01); *H04L 5/0035* (2013.01); *H04L 1/0003* (2013.01);
(Continued)

(58) Field of Classification Search
CPC .................................................. H04W 72/0413
USPC .......................................... 370/329, 328, 252
See application file for complete search history.

(56) References Cited

U.S. PATENT DOCUMENTS 8,520,491 B2 *  8/2013  Lunttila et al. ................. 370/203
8,687,555 B2 *  4/2014  Ko et al. ........................ 370/328
(Continued)

FOREIGN PATENT DOCUMENTS

WO    WO 2012/096394 A1    7/2012

OTHER PUBLICATIONS

European Search Report dated Apr. 2, 2014 in connection with European Patent Application No. 13186320.1, 6 pages.
(Continued)

*Primary Examiner* — Rasheed Gidado (57) ABSTRACT

A method for CSI report transmission includes detecting a collision in a subframe, between a first PUCCH CSI report of one serving cell with which a UE is configured in one of transmission modes 1 to 9, and a second PUCCH CSI report of another serving cell with which the UE is configured in transmission mode 10. Upon the reporting types of the collided PUCCH CSI reports having a same priority, the method transmits the first PUCCH CSI report if the CSI process index of the second PUCCH CSI report has a positive value other than 1. A method for CSI report transmission includes configuring, via a higher layer, a UE configured in transmission mode 10 whether to create a respective CSI report(s) for each aperiodic CSI process or not, using an information element including at least three one-bit variables.

21 Claims, 3 Drawing Sheets

(51) Int. Cl.
*H04W 24/10* (2009.01)
*H04L 1/00* (2006.01)

(52) U.S. Cl.
CPC .............. *H04L1/0009* (2013.01); *H04L 1/0026* (2013.01); *H04L 1/0027* (2013.01); *H04L 1/0031* (2013.01)

(56) References Cited

U.S. PATENT DOCUMENTS

| | | | |
|---|---|---|---|
| 2012/0039252 A1 | 2/2012 | Damnjanovic et al. | |
| 2012/0140708 A1 | 6/2012 | Choudhury et al. | |
| 2012/0201207 A1 | 8/2012 | Liu et al. | |
| 2013/0114455 A1* | 5/2013 | Yoo et al. | 370/252 |
| 2013/0258874 A1* | 10/2013 | Khoshnevis et al. | 370/252 |

OTHER PUBLICATIONS

Extended European Search Report dated May 19, 2014 in connection with European Patent Application No. 13186320.1, 15 pages.
3GPP TSG-RAN WG1 Meeting #70; "Introduction of Rel-11 features"; R1-124012; Qingdao, China; Aug. 13-17, 2012; 132 pages.
3GPP TSG-RAN WG1 Meeting #70; "Periodic CSI feedback collision handling for CoMP"; R1-123104; Qingdao, China; Aug. 13-17, 2012; 7 pages.
3GPP TSG-RAN WG1 Meeting #70; "CSI Collision Handling for CoMP"; R1-123468; Qingdao, China; Aug. 13-17, 2012; 3 pages.
3GPP TSG-RAN WG1 Meeting #69; "Email discussion [69-11]: FFS aspects of aperiodic CSI feedback for CoMP"; R1-122931; Prague, Czech Republic; May 21-25, 2012; 22 pages.
3GPP TSG-RAN WG2 Meeting #80; "Introducing support for Coordinated Multi-Point (CoMP) operation"; R1-125437; New Orleans, USA; Nov. 12-16, 2012; 16 pages.
3GPP TSG-RAN WG1 Meeting #58; "Introducing support for Coordinated Multi-Point (CoMP) operation"; R1-121970; Barcelona, Spain; Dec. 4-7, 2012; 17 pages.
International Search Report issued on Jan. 2, 2014 in connection with International Patent Application No. PCT/KR2013/008683, 3 pages.
Written Opinion of the International Searching Authority issued on Jan. 2, 2014 in connection with International Patent Application No. PCT/KR2013/008683, 5 pages.
"Aperiodic CSI Triggering for CoMP;" Samsung, R1-123470, 3GPP TSG RAN WG1 #70, Qingdao, China, Aug. 13-17, 2012, 3 pages.

* cited by examiner

METHOD AND APPARATUS FOR TRANSMITTING/RECEIVING CHANNEL STATE INFORMATION

CROSS-REFERENCE TO RELATED APPLICATION(S) AND CLAIM OF PRIORITY

The present application claims priority to U.S. Provisional Patent Application Ser. No. 61/706,633, filed Sep. 27, 2012, entitled "TRANSMISSION OF CHANNEL STATE INFORMATION IN WIRELESS COMMUNICATION SYSTEMS" and U.S. Provisional Patent Application Ser. No. 61/720,860, filed Oct. 31, 2012, entitled "METHODS AND APPARATUS FOR INITIAL ACCESS IN AN ADVANCED WIRELESS COMMUNICATION SYSTEM". The content of the above-identified patent documents is incorporated herein by reference.

TECHNICAL FIELD

The present application relates generally to Coordinated Multi-Point (CoMP) communication and/or Carrier Aggregation (CA) communication and, more specifically, to channel state information (CSI) feedback for CoMP and/or CA communication.

BACKGROUND

In 3rd Generation Partnership Project Long Term Evolution (3GPP LTE), Orthogonal Frequency Division Multiplexing (OFDM) is adopted as a downlink (DL) transmission scheme. A 3GPP LTE communication system includes a DownLink (DL) that conveys signals from a Base Station (BS or NodeB) to User Equipments (UEs), and an UpLink (UL) that conveys signals from UEs to a NodeB. A NodeB transmits data information to a UE using a Physical DL Shared CHannel (PDSCH) and transmits DL Control Information (DCI) to a UE using a Physical DL Control CHannel (PDCCH). A UE transmits data information to a NodeB using a Physical UL Shared CHannel (PUSCH) and transmits UL Control Information (UCI) to a NodeB using a Physical UL Control CHannel (PUCCH).

UCI may include Channel State Information (CSI), which may include Channel Quality Indicator (CQI) information and Precoding Matrix Indicator (PMI) information. The CSI informs a NodeB of DL channel conditions that a UE experiences, and accordingly, the NodeB may select appropriate parameters, such as a transmission power, a Modulation and Coding Scheme (MCS), and any other similar and/or suitable parameters, for a PDSCH or PDCCH transmission to the UE and may ensure a desired BLock Error Rate (BLER) for transmitting respective data information or DCI.

A UE measures CSI based on a DL Reference Signal (RS) transmitted from a NodeB. Different CSI processes may be associated with different CSI measurements that may be respectively obtained from different RSs or from a same RS at different parts of a DL BW. The CSI may be transmitted in a PUCCH or in a PUSCH. The CSI transmission in a PUCCH may be semi-statically configured by a NodeB so as to occur periodically or may be dynamically triggered by a NodeB, i.e., the CSI transmission in PUSCH is an aperiodic CSI, through a "CSI request" field in a DCI format conveyed by a PDCCH scheduling the PUSCH transmission and it may support large CSI payloads in order to provide the NodeB with detailed information for PDSCH scheduling.

SUMMARY

A method for transmitting Channel State Information (CSI) report in a wireless network where a plurality of cells is configured to cooperate for a User Equipment (UE) with Carrier aggregation (CA) is provided. The method includes detecting a collision in a subframe, between a first Physical Uplink Control Channel (PUCCH) CSI report of one serving cell with which the UE is configured in one of transmission modes 1 to 9, and a second PUCCH CSI report of another serving cell with which the UE is configured in transmission mode 10. The method also includes comparing the priorities of reporting types of the collided PUCCH CSI reports. The method further includes, upon the reporting types of the collided PUCCH CSI reports having a same priority, transmitting the first PUCCH CSI report if the CSI process index of the second PUCCH CSI report has a positive value other than 1.

An apparatus for transmitting Channel State Information (CSI) report in a wireless network where a plurality of cells is configured to cooperate for a User Equipment (UE) with Carrier aggregation (CA) is provided. The apparatus includes a processing circuitry configured to detect a collision in a frame, between a first Physical Uplink Control Channel (PUCCH). CSI report of one serving cell with which the UE is configured in one of transmission modes 1 to 9, and a second PUCCH CSI report of another serving cell with which the UE is configured in transmission mode 10. The circuitry is configured to compare the priorities of reporting types of the collided PUCCH CSI reports. Upon the reporting types of the collided PUCCH CSI reports having a same priority, the circuitry is configured to transmit the first PUCCH CSI report if the CSI process index of the second PUCCH CSI report has a positive value other than 1.

An apparatus for receiving Channel State Information (CSI) report in a wireless network where a plurality of cells is configured to cooperate for a User Equipment (UE) with Carrier aggregation (CA). The apparatus includes a processing circuitry configured to detect a collision in a frame, between a first Physical Uplink Control Channel (PUCCH) CSI report of one serving cell with which the User Equipment UE is configured in one of transmission modes 1 to 9, and a second PUCCH CSI report of another serving cell with which the UE is configured in transmission mode 10. The circuitry is configured to compare the priorities of reporting types of the collided PUCCH CSI reports. Upon the reporting types of the collided CSI reports having a same priority, the circuitry is configured to configure the UE to transmit the first PUCCH CSI report if the CSI process index of the second PUCCH CSI report has a positive value other than 1.

A method for receiving Channel State Information (CSI) report in a wireless network where a plurality of cells is configured to cooperate with Carrier aggregation (CA) is provided. The method includes detecting a collision in a frame, between a first Physical Uplink Control Channel (PUCCH) CSI report of one serving cell with which a User Equipment (UE) is configured in one of transmission modes 1 to 9, and a second PUCCH CSI report of another serving cell with which the UE is configured in transmission mode 10. The method further includes comparing the priorities of reporting types of the collided PUCCH CSI reports. The method further includes, upon the reporting types of the collided PUCCH CSI reports having a same priority, configuring the UE to transmit the first PUCCH CSI report if the CSI process index of the second PUCCH CSI report has a positive value other than 1.

A method for receiving Channel State Information (CSI) report in a wireless network where a plurality of cells is configured to cooperate for a User Equipment (UE) with Carrier aggregation (CA) is provided. The method includes configuring, via a higher layer, a UE configured in transmission mode 10 whether to create a respective CSI report(s) for each aperiodic CSI process or not, using an information element including at least three one-bit variables. Herein, the at least three one-bit variables include a trigger01-r11 corresponding to a state '01' of a CSI request field of, a trigger10-r11 corresponding to a state '10' of the CSI request field, and a trigger11-r11 corresponding to a state '11' of the CSI request field, where the CSI request field is conveyed in uplink DCI format that schedules a Physical Uplink Shared Channel (PUSCH) for to a serving cell.

An apparatus for receiving Channel State Information (CSI) report in a wireless network where a plurality of cells is configured to cooperate for a User Equipment (UE) configured in transmission mode 10 with Carrier aggregation (CA) is provided. The apparatus includes a processing circuitry configured to configure, via a higher layer, the UE whether to create a respective CSI report(s) for each aperiodic CSI process or not, using an information element including at least three one-bit variables. Herein, the at least three one-bit variables include a trigger01-r11 corresponding to a state '01' of a CSI request field, a trigger10-r11 corresponding to a state '10' of the CSI request field, and a trigger11-r11 corresponding to a state '11' of the CSI request field, where the CSI request field is conveyed in uplink DCI format that schedules a Physical Uplink Shared Channel (PUSCH) for to a serving cell.

An apparatus fort transmitting Channel State Information (CSI) report in a wireless network where a plurality of cells is configured to cooperate for a User Equipment (UE) configured in transmission mode 10 with Carrier aggregation (CA) is provided. The UE includes a processing circuitry configured to receive a higher layer's configuration whether to create a respective CSI report(s) for each aperiodic CSI process or not, using an information element including at least three one-bit variables. Herein, the at least three one-bit variables include a trigger01-r11 corresponding to a CSI request field of state '01', a trigger10-r11 corresponding to a CSI request field of state '10', and a trigger11-r11 corresponding to a CSI request field of state '11', where the CSI request field is conveyed to a serving cell in uplink DCI format.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-5, discussed below, and the various embodiments used to describe the principles of the present disclosure in this patent document are by way of illustration only and should not be construed in any way to limit the scope of the disclosure. Those skilled in the art will understand that the principles of the present disclosure may be The following documents and standards descriptions are hereby incorporated into the present disclosure as if fully set forth herein: 1) 3GPP TS 36.211 V10.5.0, "E-U IRA, Physical channels and modulation" (REF1); 2) 3GPP TS 36.212 v10.5.0, "E-UTRA, Multiplexing and Channel coding" (REF2); 3) 3GPP TS 36.213 v10.5.0, "E-UTRA, Physical Layer Procedures" (REF3).

Figure 1:
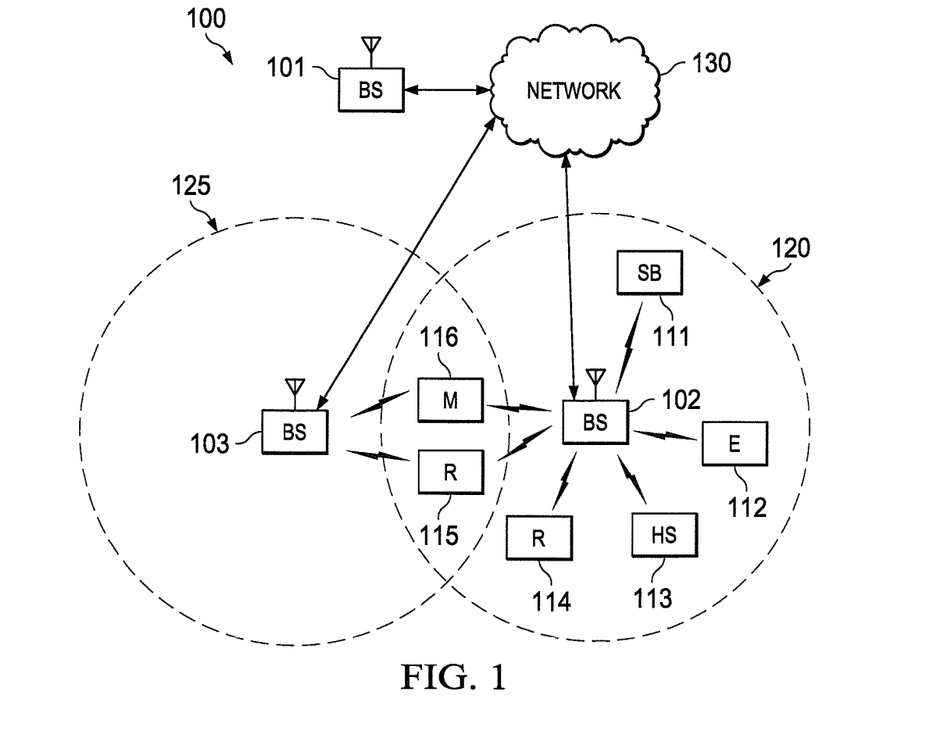
FIG. 1 illustrates an example wireless system that transmits messages in accordance with embodiments of the present disclosure.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with network 130 or a similar IP-based system (not shown).

Base station 102 provides wireless broadband access (via base station 101) to network 130 to a first plurality of UEs (e.g., mobile phone, mobile station, subscriber station) within coverage area 120 of base station 102. The first plurality of UEs includes UE 111, which may be located in a small business (SB); UE 112, which may be located in an enterprise (E); UE 113, which may be located in a WiFi hotspot (HS); UE 114, which may be located in a first residence (R); UE 115, which may be located in a second residence (R); and UE 116, which may be a mobile device (M), such as a cell phone, a wireless laptop, a wireless PDA, or the like.

Depending on the network type, other well-known terms may be used instead of "base station," such as "eNodeB" or "access point". For the sake of convenience, the term "base station" shall be used herein to refer to the network infrastructure components that provide wireless access to remote terminals. In addition, the term "user equipment" or "UE" is used herein to designate any remote wireless equipment that wirelessly accesses a base station and that can be used by a consumer to access services via the wireless communications network, whether the UE is a mobile device (e.g., cell phone) or is normally considered a stationary device (e.g., desktop personal computer, vending machine, etc.). Other well know terms for the remote terminals include "mobile stations" (MS) and "subscriber stations" (SS), "remote terminal" (RT), "wireless terminal" (WT), and the like.

Base station 103 provides wireless broadband access (via base station 101) to network 130 to a second plurality of UEs within coverage area 125 of base station 103. The second plurality of UEs includes UE 115 and UE 116. In an exemplary embodiment, base stations 101-103 may communicate with each other and with UEs 111-116 using OFDM or OFDMA techniques. In some embodiments, one or more of base stations 101-103 may communicate with each other and with UEs 111-116 using 5G, LTE, LTE-A, or WiMAX techniques including techniques for: transmission of channel state information as described in embodiments of the present disclosure.

While only six UEs are depicted in FIG. 1, it is understood that wireless system 100 may provide wireless broadband access to additional UEs. It is noted that UE 115 and UE 116 are located on the edges of both coverage area 120 and coverage area 125. UE 115 and UE 116 each communicate with both base station 102 and base station 103 and may be said to be operating in handoff mode, as known to those of skill in the art.

UEs 111-116 may access voice, data, video, video conferencing, and/or other broadband services via network 130. In an exemplary embodiment, one or more of UEs 111-116 may be associated with an access point (AP) of a WiFi WLAN. UE 116 may be any of a number of mobile devices, including a wireless-enabled laptop computer, personal data assistant, notebook, handheld device, or other wireless-enabled device. UEs 114 and 115 may be, for example, a wireless-enabled personal computer (PC), a laptop computer, a gateway, or another device.

Figure 2:
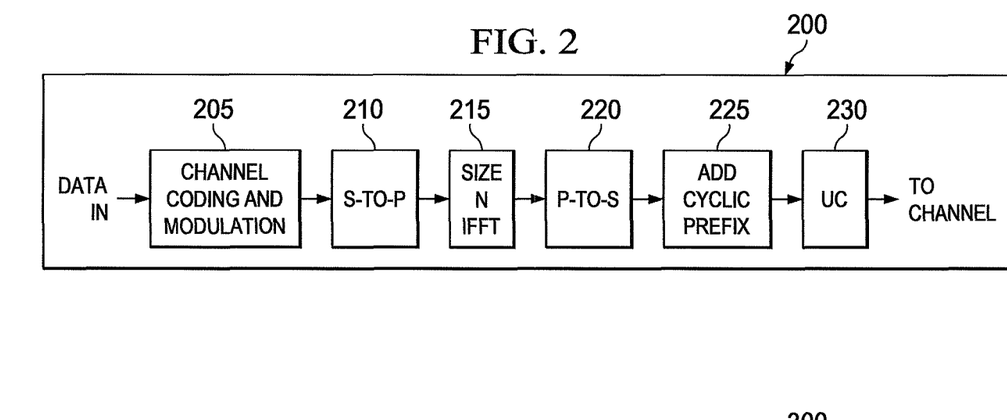
FIG. 2 illustrates a high-level diagram of an orthogonal frequency division multiple access transmit path in accordance with embodiments of the present disclosure.
Figure 3:
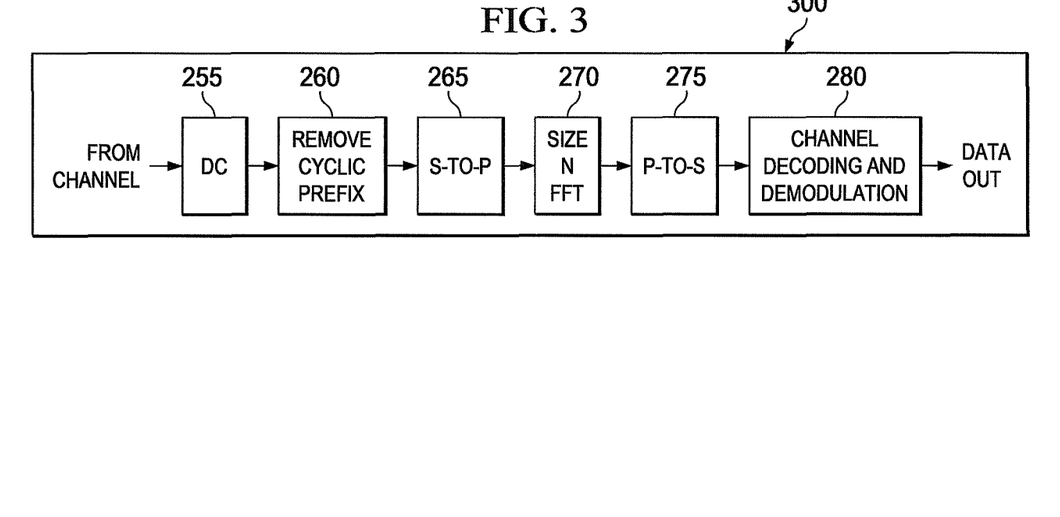
FIG. 3 illustrates a high-level diagram of an orthogonal frequency division multiple access receive path in accordance with embodiments of the present disclosure.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a UE (e.g., UE 116 of FIG. 1). In other examples, for uplink communication, the receive path circuitry 300 may be implemented in a base station (e.g., base station 102 of FIG. 1) or a relay station, and the transmit path circuitry 200 may be implemented in a UE (e.g., UE 116 of FIG. 1). In certain embodiments, transmit path 200 and receive path 300 are configured to perform methods for transmission of channel state information as described in embodiments of the present disclosure state information.

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to base stations 101-103 and may implement a receive path corresponding to the architecture for receiving in the downlink from base stations 101-103.

Figure 4:
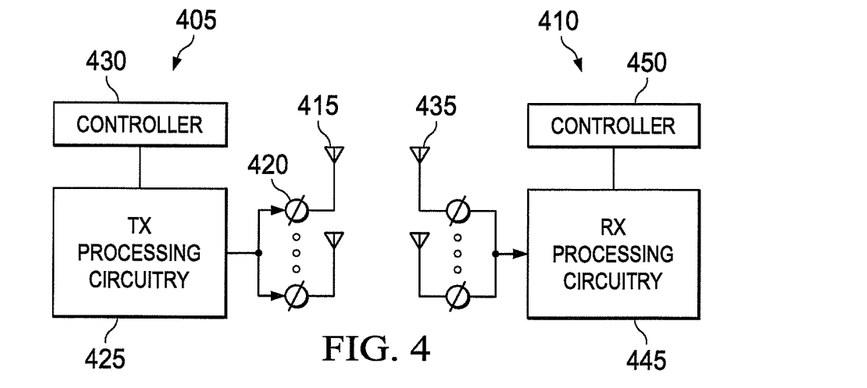
FIG. 4 illustrates a block diagram of a transmitter and a receiver in a wireless communication system that may be used to implement various embodiments of the present disclosure.

FIG. 4 illustrates a block diagram of a transmitter 405 and a receiver 410 in a wireless communication system that can be used to implement various embodiments of the present disclosure. The embodiment of the transmitter 405 and receiver 410 shown in FIG. 4 is for illustration only. Other embodiments could be used without departing from the scope of this disclosure.

In this illustrative example, the transmitter 405 and the receiver 410 are devices at a communication point in a wireless communication system, such as, for example, wireless system 100 in FIG. 1. In some embodiments, the transmitter 405 or the receiver 410 is a network entity, such as a base station, e.g., an evolved node B (eNB), a remote-radio head, a relay station, an underlay base station; a gateway (GW); or a base station controller (BSC). In other embodiments, the transmitter 405 or the receiver 410 is a UE (e.g., mobile station, subscriber station, etc.), such as UE 116. In one example, the transmitter 405 or the receiver 410 is an example of one embodiment of the UE 116 in FIG. 1. In another example, the transmitter 405 or the receiver 410 is an example of one embodiment of the base station 102 in FIG. 1.

The transmitter 405 comprises antenna(s) 415, phase shifters 420, Tx processing circuitry 425, and controller 430. The transmitter 405 receives analog or digital signals from outgoing baseband data. Transmitter 405 encodes, multiplexes, and/or digitizes the outgoing baseband data to produce a processed RF signal that is sent and/or transmitted via transmitter 405. For example, the Tx processing circuitry 425 can implement a transmit path that is analogous to the transmit processing circuitry 200 in FIG. 2. Transmitter 405 also can perform spatial multiplexing via layer mapping to different antennas in antenna(s) 415 to transmit signals in multiple different beams. The controller 430 controls the overall operation of transmitter 405. In one such operation, controller 430 controls the transmission of signals by the transmitter 405 in accordance with well-known principles.

Receiver 410 receives from antenna(s) 435, an incoming RF signal or signals transmitted by one or more transmission points, such as base stations, relay stations, remote radio heads, UEs, and the like. Receiver 410 includes Rx processing circuitry 445 that processes the received signal(s) to identify the information transmitted by the transmission point(s). For example, the Rx processing circuitry 445 may downconvert the incoming RF signal(s) to produce an intermediate frequency (IF) or a baseband signal by channel estimating, demodulating, stream separating, filtering, decoding, and/or digitizing the received signal(s). For example, the Rx processing circuitry 445 can implement a receive path that is analogous to the receive processing circuitry 300 in FIG. 3. The controller 450 controls the overall operation of the receiver 410. In one such operation, the controller 450 controls the reception of signals by the receiver 410 in accordance with well-known principles.

For an aperiodic Channel State Information (CSI) Reporting using a Physical Uplink Share Channel (PUSCH), UE 116 performs an aperiodic CSI reporting using the PUSCH in subframe n+k on serving cell c, upon decoding in subframe n either: an uplink DCI format, or a Random Access Response Grant, for serving cell c if the respective CSI request field is set to trigger a report and is not reserved. If the CSI request field is 1 bit, a report is triggered for serving cell c if the CSI request field is set to '1'. If the CSI request field size is 2 bits, a report is triggered according to the value in TABLE 1 corresponding to aperiodic CSI reporting. UE 116 is not expected to receive more than one aperiodic CSI report request for a given subframe.

TABLE 1 defines CSI Request fields for PDCCH with a Downlink Control Information (DCI) format in the UE specific search space.

TABLE 1

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

It is noted that a PDCCH with DCI formats used to grant PUSCH transmissions as given by DCI format 0 and DCI format 4 are herein referred to as an uplink DCI format when common behavior is addressed.

Alternatively, R1-123470, the disclosure of which is incorporated herein by reference, proposes TABLE 2 defining the number of bits in the CSI request field for the aperiodic CSI triggering for CoMP and Carrier Aggregation (CA) as follows:

TABLE 2

| A single CSI process and a single CC | | Multiple CSI processes or multiple CCs | |
|---|---|---|---|
| Common search space | UE specific search space | Common search space | UE specific search space |
| 1 bit | 1 bit | 1 bit | 2 bits |

In TABLE 2, the number of bits in the CSI request field for a UE is selected depending on the number of configured DL Component Carriers (CCs) and the number of configured CSI processes for the UE.

R1-123470 further proposes TABLE 3 defining the states of the 2-bit CSI request field for PDCCH with uplink grant in UE specific search space, as follows:

TABLE 3

| Value of CSI request field | Description |
|---|---|
| '00' | No aperiodic CSI report is triggered |
| '01' | Aperiodic CSI report is triggered for all CSI processes for serving cell c |
| '10' | Aperiodic CSI report is triggered for a $1^{st}$ set of CSI processes for a $1^{st}$ set of serving cells configured by higher layers |
| '11' | Aperiodic CSI report is triggered for a $2^{nd}$ set of CSI processes for a $2^{nd}$ set of serving cells configured by higher layers |

As an alternative, in the case of a single Carrier Component (CC) configuration where multiple CSIs are configured for CoMP, R1-123296 proposes TABLE 4 defining the states of 2-bit CSI request field for a Physical Downlink Control Channel (PDCCH) with uplink grant in UE specific search space as follows:

TABLE 4

| Value of CSI request field | Description |
|---|---|
| '00' | No aperiodic CSI report is triggered |
| '01' | Aperiodic CSI report is triggered for a $1^{st}$ set of CSI processes configured by higher-layers |
| '10' | Aperiodic CSI report is triggered for a $2^{nd}$ set of CSI processes configured by higher-layers |

TABLE 4-continued

| Value of CSI request field | Description |
|---|---|
| '11' | Aperiodic CSI report is triggered for a 3$^{rd}$ set of CSI processes configured by higher-layers |

Rel-10 3GPP TS36.213 of REF3 describes the UE behaviors associated with UCI-only transmissions as follows: in the section 8.6, to determine the modulation order, redundancy version and transport block size for the physical uplink shared channel, the UE first reads the "modulation and coding scheme and redundancy version" field ($I_{MSC}$), and check the "CSI request" bit field, and computes the total number of allocated PRBs ($N_{PRB}$) based on the procedure defined in Section 8.1, and computes the number of coded symbols for control information.

Further, in the section 8.6.1 of REF3, if DCI format 0 is used and $I_{MCS}$29 or, if DCI format 4 is used and only 1 TB is enabled and $I_{MCS}$=29 for the enabled TB and the signaled number of transmission layers is 1, and if the "CSI request" bit field is 1 bit and the bit is set to trigger an aperiodic report and, $N_{PRB} \leq 4$ or, the "CSI request" bit field is 2 bits and is triggering an aperiodic CSI report for one serving cell according to TABLE 1, and, $N_{PRB} \leq 4$ or, the "CSI request" bit field is 2 bits and is triggering an aperiodic CSI report for more than one serving cell according to TABLE 1 and, $N_{PRB} \leq 20$, then the modulation order is set to $Q_m = 2$.

For the UCI-only triggering condition, the section 8.6.2 describes if DCI format 0 is used and $I_{MCS}$=29 or, if DCI format 4 is used and only 1 TB is enabled and $I_{MCS}$=29 for the enabled TB and the number of transmission layers is 1, and if the "CSI request" bit field is 1 bit and is set to trigger an aperiodic CSI report and $N_{PRB} \leq 4$, or the "CSI request" bit field is 2 bits and is triggering an aperiodic CSI report for one serving cell according to TABLE 1, and, $N_{PRB} \leq 4$ or, the "CSI request" bit field is 2 bits and is triggering aperiodic CSI report for more than one serving cell according to TABLE 1 and, $N_{PRB} \leq 20$, then there is no transport block (TB) for the UL-SCH and only the control information feedback for the current PUSCH reporting mode is transmitted by the UE.

In Rel-11, when a UE is configured with DL CoMP, the UE can be triggered to report an aperiodic CSI for multiple transmission points. When the UE is triggered to report the aperiodic CSI under the UCI-only triggering condition, the code rate for the aperiodic CSI can be large, which hinders reliable decoding of the aperiodic CSI at the eNB receiver. TABLE 5 lists CQI code rates with QPSK modulation, 4 RB allocation and 2 CSI-process reporting for normal CP and TABLE 6 lists CQI code rates with QPSK modulation, 4 RB allocation and 2 CSI-process reporting for extended CP.

TABLE 5

| CQI report size per CSI process (incl. CRC) | PUSCH contents | | | | | | | |
|---|---|---|---|---|---|---|---|---|
| | CQI | CQI SRS | CQI A/N | CQI RI | CQI A/N SRS | CQI RI SRS | CQI A/N RI | CQI A/N RI SRS |
| 32 | 0.028 | 0.030 | 0.042 | 0.042 | 0.048 | 0.048 | 0.083 | 0.111 |
| 40 | 0.035 | 0.038 | 0.052 | 0.052 | 0.060 | 0.060 | 0.104 | 0.139 |
| 56 | 0.049 | 0.053 | 0.073 | 0.073 | 0.083 | 0.083 | 0.146 | 0.194 |
| 72 | 0.063 | 0.068 | 0.094 | 0.094 | 0.107 | 0.107 | 0.188 | 0.250 |

TABLE 6

| CQI report size per CSI process (incl. CRC) | PUSCH content | | | | | | | |
|---|---|---|---|---|---|---|---|---|
| | CQI | CQI SRS | CQI A/N | CQI RI | CQI A/N SRS | CQI RI SRS | CQI A/N RI | CQI A/N RI SRS |
| 32 | 0.033 | 0.037 | 0.056 | 0.056 | 0.067 | 0.067 | 0.167 | 0.333 |
| 40 | 0.042 | 0.046 | 0.069 | 0.069 | 0.083 | 0.083 | 0.208 | 0.417 |
| 56 | 0.058 | 0.065 | 0.097 | 0.097 | 0.117 | 0.117 | 0.292 | 0.583 |
| 72 | 0.075 | 0.083 | 0.125 | 0.125 | 0.150 | 0.150 | 0.375 | 0.750 |

3GPP TS36.212 of REF2 specifies DCI format 0 and DCI format 4, which schedule PUSCH in one UL cell. DCI format 0 is used for the scheduling of PUSCH in one UL cell and DCI format 4 is used for the scheduling of PUSCH in one UL cell with a multi-antenna port transmission mode.

A DCI format 0 carries, in part, the following information: carrier indicator—0 or 3 bits—this field is present according to the definitions in REF3; resource block assignment and hopping resource allocation—$\lceil \log_2(N_{RB}^{UL}(N_{RB}^{UL}+1)/2) \rceil$ bits; modulation and coding scheme and redundancy version—5 bits as defined in section 8.6 of REF3; CSI request—1 or 2 bits as defined in TABLE 1. The 2-bit field only applies to UEs that are configured with more than one DL cell and when the corresponding DCI format is mapped onto the UE specific search space given by the C-RNTI as defined in REF3.

A DCI format 4 carries, in part, the following information: carrier indicator—0 or 3 bits—the field is present according to the definitions in REF3; resource block assignment—

$$\max\left(\lceil \log_2(N_{RB}^{UL}(N_{RB}^{UL}+1)/2) \rceil, \left\lceil \log_2\left(\binom{\lceil N_{RB}^{UL}/P+1 \rceil}{4}\right) \right\rceil\right)$$

bits, where P is the UL RBG size as defined in section 8.1.2 of REF3; and CSI request—1 or 2 bits as defined in TABLE 1—the 2-bit field only applies to UEs that are configured with more than one DL cell.

In 3GPP Rel-10, a PDCCH includes a 2 bit field for triggering aperiodic CSI reporting. The interpretation of two values of this field is defined by RRC using field aperiodic CSI-Trigger. In particular, for each value the field specifies for which Secondary Cell (SCell) the trigger applies. This is part of the Aperiodic CQI configuration of the Primary Cell (Pcell), as shown by the following extract.

```
CQI-ReportAperiodic-r10 ::=    CHOICE {
    release                        NULL,
    setup                          SEQUENCE {
      cqi-ReportModeAperiodic-r10     CQI-ReportModeAperiodic,
      aperiodicCSI-Trigger-r10        SEQUENCE {
        trigger1-r10                    BIT STRING (SIZE (8)),
        trigger2-r10                    BIT STRING (SIZE (8))
      }                              OPTIONAL   -- Need OR
    }
}
```

It would have been more consistent to specify as part of the configuration of each SCell whether or not the trigger is applicable, e.g., as follows:

```
CQI-ReportAperiodic-r10 ::=          CHOICE {
    release                              NULL,
    setup                                SEQUENCE {
        cqi-ReportModeAperiodic-r10          CQI-ReportModeAperiodic,
        aperiodicCSI-Trigger-r10             SEQUENCE {
            trigger1-r10                         ENUMERATED {setup}    OPTIONAL,   -- Need
    OR
            trigger2-r10                         ENUMERATED {setup}    OPTIONAL    -- Need
    OR
        }                                                              OPTIONAL    -- Cond
    SCell
    }
}
```

In Rel-11 the situation is similar, except that it should now also be possible to specify if a particular trigger is applicable for a particular process. The most natural way to do this would be to specify this as part of the process specific configuration as follows:

```
CQI-ReportAperiodicExt-r11 ::=       SEQUENCE {
    csi-Trigger-r10                      SEQUENCE {
        trigger1-r10                         ENUMERATED {setup}    OPTIONAL,   -- Need
    OR
        trigger2-r10                         ENUMERATED {setup}    OPTIONAL    -- Need
    OR
    }                                                              OPTIONAL,   -- Cond SCell
    ...
}
```

R1-123931 presents a proposal for reducing UE complexity for calculating CSI in case a UE is configured with coordinated multi-point (CoMP) and carrier aggregation (CA), as follows: in case carrier aggregation and CoMP are agreed to be supported simultaneously, at most X CSI Processes are configurable for a specific component carrier (cell index) and in case of multicarrier, at most 2X CSI Processes are configurable in total for all configured component carriers, or the number of processes Y is a UE capability.

This proposal shows a necessity of providing a solution to resolve the high code-rate issues arising when a UE configured with CoMP and CA is triggered to transmit PUSCH with only UCI without TB. For example, when X=3, the maximum number of bits for the CSI on the UCI-only PUSCH can be 6X of the number of bits corresponding to CSI for a single IP in a single cell. The previous solution in LIE R10 did not consider the high code-rate issues associated with the CoMP, and this motivates the current disclosure.

As discussed above, X is the maximum number of CSI processes configurable for aperiodic CSI reporting. In one alternative, X is 3; in another alternative, X is 4, considering reasonable UE complexity for CSI derivation. One example value of Y is 5, which is the same as the maximum configurable number of DL CCs, defined in 3GPP LTE Rel-10.

In order for the eNB to reliably decode UCI (or CSI) on a UCI-only PUSCH transmitted by a UE configured with DL CoMP (or configured with more than one CSI processes in at least one serving cell), a new set of UCI-only PUSCH triggering conditions has to be defined for such a UE. For the reliable decoding of the UCI (or CSI), the new set of UCI-only PUSCH triggering conditions should be able to ensure the code rate of the CSI being less than a threshold number, e.g., 0.5. However, if the current set of conditions defined in the LTE specifications are reused for a UE configured with DL CoMP, the code rate of the CSI on a UCI-only PUSCH can become quite large (~0.5) especially when extended-CP is used and CQI, A/N, RI and SRS are transmitted in the same subframe as the UCI-only PUSCH, as illustrated in the example shown in TABLE 6.

Embodiments of this disclosure propose a few methods to improve the reliability of receiving UCI-only PUSCH less than 0.5, even when the aperiodic CSI reporting on the PUSCH is triggered for CoMP and/or CA.

For keeping the code rate low (e.g., <0.5) for a PUSCH carrying only UCI without a TB for a UE configured with CoMP, it is proposed that a threshold number of PRBs ($T_{PRB}$) for triggering of a UCI-only PUSCH changes depending upon at least the number of CSI processes which the current aperiodic CSI report on the PUSCH is associated with. Note that one of the conditions for triggering of a UCI-only PUSCH is $N_{PRB} \leq T_{PRB}$. When UE 116 is configured with CA, the threshold number of PRBs for the UCI-only changes depending upon the number of serving cells associated with the current aperiodic CSI report on the PUSCH as well.

The first approach according to the present disclosure relates to table selection for a CSI request field. In certain embodiments, when UE 116 is configured with more than one CSI process, the number of bits in the CSI request bit field is determined as 2, and one of TABLE 2 or TABLE 3 will be selected for the aperiodic CSI triggering.

Meanwhile, the CSI request bit field size for UE 116 also changes depending on the number of configured DL CCs for UE 116 as in the 3GPP L Rel-10 specifications. The 3GPP LIE Rel-10 specifications state that the CSI request field size is 2 bits if the number of configured DL CCs is more than one, while the size is 1 bit if the number of configured DL CCs is one.

In certain embodiments, UE 116 determines the CSI request bit size for the UL grant DCI formats (i.e., DCI formats 0 and 4), according to the following. For DCI format 0, a CSI request field has 1 or 2 bits according to either TABLE 1 or the selected table out of TABLE 2 and TABLE 3. The 2-bit field only applies to UEs that are configured with more than one DL cell or with more than one CSI process and when the corresponding DCI format is mapped onto the UE specific search space given by the C-RNTI as defined in REF3.

Also, for DCI format 4, a CSI request field has 1 or 2 bits according to either. TABLE 1 or the selected table out of TABLE 2 and TABLE 3. The 2-bit field only applies to UEs that are configured with more than one DL cell or with more than one CSI process.

In order to maintain UE complexity low, in certain embodiments, UE 116 configured with more than one DL serving cells is not expected to be configured with more than one CSI process in any of the more than one DL serving cells. In these cases, TABLE 1 is used for UE 116 configured with more than one DL CCs. The selected table out of TABLE 2 and TABLE 3 is used for UE 116 configured with a single DL serving cell and more than one CSI process in the DL serving cell.

Alternatively, in order to provide full network configuration flexibility (of CA and CoMP), UE 116 configured with more than one DL serving cell can also be configured with more than one CSI process in some of the more than one DL serving cells.

One alternative is that UE 116 determines an aperiodic CQI triggering table based upon the number of configured CSI processes in the configured DL serving cells. In other words, TABLE 1 is used for UE 116 configured with more than one DL CCs, where the UE 116 is configured with a single CSI process (or a legacy CSI reporting configuration) in each of the more than one DL CCs.

The selected table out of TABLE 2 and TABLE 3 is used for UE 116 configured with more than one CSI process in at least one of the configured DL serving cells. This alternative keeps RRC overhead low by not introducing a special signalling for the UE's table selection.

Another alternative is that UE 116 is configured to determine an aperiodic CQI triggering table based upon whether UE 116 receives Rel-10 RRC configuration or Rel-11 RRC configuration. TABLE 1 is used for UE 116 configured with more than one DL CCs and with Rel-10 aperiodic CSI-triggering configuration (or RRC configuration of CQI-ReportAperiodic-r10).

The selected table out of TABLE 2 and TABLE 3 is used for UE 116 configured with the Rel-11 aperiodic CSI-triggering configuration (or RRC configuration of CQI-ReportAperiodicExt-r11). This alternative simplifies the UE implementation of selecting the table.

In the second approach according to the present disclosure, the threshold number of PRBs determined depending on the configured table for aperiodic CSI triggering. In certain embodiments, the threshold number of PRBs to be used for determining a UCI-only PUSCH, $T_{PRB}$, is determined depending on whether TABLE 1 or the selected table out of TABLE 2 and TABLE 3 is configured. When UE 116 is configured with the TABLE 1, $T_{PRB}$ is determined as in Rel-10 specifications; alternatively, when UE 116 is configured with the selected table out of TABLE 2 and TABLE 3, $T_{PRB}=T_{PRB}^{(2)}$, and $T_{PRB}^{(2)}$ is determined based upon at least one of number of configured CSI processes and number of configured DL serving cells.

In certain embodiments, UE 116 is triggered to report only UCI without a TB on the PUSCH when the following conditions are satisfied: if DCI format 0 is used and $I_{MCS}=29$ or, if DCI format 4 is used and only 1 TB is enabled and $I_{MCS}=29$ for the enabled TB and the number of transmission layers is 1; if the "CSI request" bit field is triggering an aperiodic CSI report and if the number of scheduled PUSCH PRBs is less than or equal to $T_{PRB}$, or $N_{PRB} \leq T_{PRB}$.

In the first example, $T_{PRB}^{(2)}$ is determined as 8X (or Y) when the selected table out of TABLE 2 and TABLE 3 is configured, which allows to reduce the complexity of the UE implementation and to keep the UCI-only PUSCH decoding reliable in all the cases. Also it is noted that the selected number corresponds to the worst case where a CSI report contains CSI of the largest possible number of CSI processes that can be configured to UE 116, which can be either 8X or Y.

When UE 116 determines a table for aperiodic CSI triggering (i.e., either TABLE 1 or the selected table out of TABLE 2 and TABLE 3) according to certain embodiments, UE 116 determines UCI-only PUSCH triggering according to the following example condition: if DCI format 0 is used and $I_{MCS}=29$ or, if DCI format 4 is used and only 1 TB is enabled and $I_{MCS}=29$ for the enabled TB and the number of transmission layers is 1, and if the "CSI request" bit field is 1 bit and is set to trigger an aperiodic CSI report and $N_{PRB} \leq 4$, or the "CSI request" bit field is 2 bits and is triggering an aperiodic CSI report for one serving cell according to TABLE 1, and, $N_{PRB} \leq 4$ or, the "CSI request" bit field is 2 bits and is triggering aperiodic CSI report for more than one serving cell according to TABLE 1 and, $N_{PRB} \leq 20$, the "CSI request" bit field is 2 bits and is triggering aperiodic CSI report according to the selected table out of TABLE 2 and TABLE 3 and, (Alt 1: $N_{PRB} \leq 8X$, Alt 2: $N_{PRB} \leq Y$), then there is no transport block (TB) for the UL-SCH and only the control information feedback for the current PUSCH reporting mode is transmitted by UE 116.

In the second example, $T_{PRB}^{(2)}$ is determined as 8X (or Y) when an aperiodic CSI is triggered for more than one CSI process according to the selected table out of TABLE 2 and TABLE 3; and $T_{PRB}^{(2)}$ is determined as 4 when an aperiodic CSI is triggered for more than one CSI process according to the selected table out of TABLE 2 and TABLE 3. This method has a similar motivation as the first embodiment.

When UE 116 determines a table for aperiodic CSI triggering (i.e., either TABLE 1 or the selected table out of TABLE 2 and TABLE 3) according to the first embodiment, UE 116 can determine UCI-only PUSCH triggering according to the following example condition: if DCI format 0 is used and $I_{MCS}=29$ or, if DCI format 4 is used and only 1 TB is enabled and $I_{MCS}=29$ for the enabled TB and the number of transmission layers is 1, and if the "CSI request" bit field is 1 bit and is set to trigger an aperiodic CSI report and $N_{PRB} \leq 4$, or the "CSI request" bit field is 2 bits and; the bit field is triggering an aperiodic CSI report either for one serving cell according to TABLE 1, or for one CSI process in a single serving cell according to the selected table out of TABLE 2 and TABLE 3, and, $N_{PRB} \leq 4$ or, the "CSI request" bit field is 2 bits and is triggering aperiodic CSI report for more than one serving cell according to TABLE 1 and, $N_{PRB} \leq 20$, or the "CSI request" bit field is 2 bits and is triggering aperiodic CSI report for more than one CSI process in a single serving cell or for more than one serving cell according to the selected table out of TABLE 2 and TABLE 3 and, (Alt 1: $N_{PRB} \leq 8X$, Alt 2: $N_{PRB} \leq Y$), then there is no transport block (TB) for the UL-SCH and only the control information feedback for the current PUSCH reporting mode is transmitted by UE 116.

In third example, $T_{PRB}^{(2)}$ is determined as 4X if an aperiodic CSI report is triggered for a single DL serving cell according to the selected table out of TABLE 2 and TABLE 3; and on the other hand $T_{PRB}^{(2)}$ is determined as 8X (or Y) if an aperiodic CSI report is triggered for more than single DL serving cell according to the selected table out of TABLE 2 and TABLE 3. This is to keep the scheduling restriction for UCI-only transmissions small, when the triggered CSI report is for a single DL serving cell according to the selected table out of TABLE 2 and TABLE 3.

It is noted that the selected number corresponds to the worst cases, (1) a CSI report contains CSI of the largest possible number of CSI processes that can be configured for a single DL serving cell (which will lead to choose 4X PRBs for the threshold number of PRBs) (2) a CSI report contains CSI of the largest possible number of CSI processes that can be configured to a UE (which will lead to choose 8X or Y for the threshold number of PRBs).

When UE 116 determines a table for aperiodic CSI triggering (i.e., either TABLE 1 or the selected table out of TABLE 2 and TABLE 3) according to Embodiment 1, UE 116 is configured to determine UCI-only PUSCH triggering according to the following condition: if DCI format 0 is used and $I_{MCS}$=29 or, if DCI format 4 is used and only 1 TB is enabled and $I_{MCS}$=29 for the enabled TB and the number of transmission layers is 1, and if the "CSI request" bit field is 1 bit and is set to trigger an aperiodic CSI report and $N_{PRB} \leq 4$, or the "CSI request" bit field is 2 bits and is triggering an aperiodic CSI report for one serving cell according to TABLE 1, and, $N_{PRB} \leq 4$ or, the "CSI request" bit field is 2 bits and is triggering an aperiodic CSI report for one serving cell according to the selected table out of TABLE 2 and TABLE 3, and $N_{PRB} \leq 4X$, or, the "CSI request" bit field is 2 bits and is triggering aperiodic CSI report for more than one serving cell according to TABLE 1 and, $N_{PRB} \leq 20$, the "CSI request" bit field is 2 bits and is triggering aperiodic CSI report for more than one serving cell according to the selected table out of TABLE 2 and TABLE 3 and, (Alt 1: $N_{PRB} \leq 8X$, Alt 2: $N_{PRB} \leq Y$), then there is no transport block for the UL-SCH and only the control information feedback for the current PUSCH reporting mode is transmitted by UE 116.

In the fourth example, $T_{PRB}^{(2)}$ is determined as 4 if an aperiodic CSI report is triggered for a single CSI processes in a single DL serving cell according to the selected table out of TABLE 2 and TABLE 3; $T_{PRB}^{(2)}$ is determined as 4X if an aperiodic CSI report is triggered for multiple CSI processes in a single DL serving cell according to the selected table out of TABLE 2 and TABLE 3; and $T_{PRB}^{(2)}$ is determined as 8X (or Y) if an aperiodic CSI report is triggered for more than single DL serving cell according to the selected table out of TABLE 2 and TABLE 3. This embodiment has similar motivation as the third embodiment.

When UE 116 determines a table for aperiodic CSI triggering (i.e., either TABLE 1 or the selected table out of TABLE 2 and TABLE 3) according to the first approach, UE 116 determines UCI-only PUSCH triggering according to the following condition: if DCI format 0 is used and $I_{MCS}$=29 or, if DCI format 4 is used and only 1 TB is enabled and $I_{MCS}$=29 for the enabled TB and the number of transmission layers is 1, and if the "CSI request" bit field is 1 bit and is set to trigger an aperiodic CSI report and $N_{PRB} \leq 4$, or the "CSI request" bit field is 2 bits and; the bit field is triggering an aperiodic CSI report either for one serving cell according to. TABLE 1, or for one CSI process in a single serving cell according to the selected table out of TABLE 2 and TABLE 3, and, $N_{PRB} \leq 4$ or, the "CSI request" bit field is 2 bits and is triggering an aperiodic CSI report for more than one CSI processes in one serving cell according to the selected table out of TABLE 2 and TABLE 3, and $N_{PRB} \leq 4X$, or, the "CSI request" bit field is 2 bits and is triggering aperiodic CSI report for more than one serving cell according to TABLE 1 and, $N_{PRB} \leq 20$, the "CSI request" bit field is 2 bits and is triggering aperiodic CSI report for more than one serving cell according to the selected table out of TABLE 2 and TABLE 3 and, (Alt 1: $N_{PRB} \leq 8X$, Alt 2: $N_{PRB} \leq Y$), then there is no transport block for the UL-SCH and only the control information feedback for the current PUSCH reporting mode is transmitted by UE 116.

In the third approach according to embodiments of the present disclosure, the threshold number of PRBs is determined depending on the number of configured CSI processes. In certain embodiments, the threshold number of PRBs to be used for determining a UCI-only PUSCH, $T_{PRB}$, is determined depending on the number of configured CSI processes.

In certain embodiments, $T_{PRB}$ is 4 if the aperiodic CSI report is on one CSI process, and $T_{PRB}$ is 20 if the aperiodic CSI report is on more than one CSI process, which is to reduce the complexity of UE 116 implementation and to keep the UCI-only PUSCH decoding reliable in all the cases. It is noted that the selected number corresponds to the worst case where a CSI report contains CSI of the largest possible number of CSI processes that can be configured to UE 116.

In certain embodiments, when UE 116 determines a table for aperiodic CSI triggering (i.e., either TABLE 1 or the selected table out of TABLE 2 and TABLE 3) according to Embodiment 1, UE 116 should determine UCI-only PUSCH triggering according to the following condition: if DCI format 0 is used and $I_{MCS}$=29 or, if DCI format 4 is used and only 1 TB is enabled and $I_{MCS}$=29 for the enabled TB and the number of transmission layers is 1, and if the "CSI request" bit field is 1 bit and is set to trigger an aperiodic CSI report and $N_{PRB} \leq 4$, or the "CSI request" bit field is 2 bits and is triggering an aperiodic CSI report for one CSI process according to TABLE 1 or the selected table out of TABLE 2 and TABLE 3, and, $N_{PRB} \leq 4$ or, the "CSI request" bit field is 2 bits and is triggering aperiodic CSI report for more than one CSI process according to TABLE 1 or the selected table out of TABLE 2 and TABLE 3 and, $N_{PRB} \leq 20$ then there is no transport block for the UL-SCH and only the control information feedback for the current PUSCH reporting mode is transmitted by UE 116.

Meanwhile, in RAN1#70, a definition of a CSI process is agreed as follows: a CSI process is a combination of a NZP CSI-RS resource and an IMR. A given CSI process can be used by periodic and/or aperiodic reporting. As a result, CR 36.213 (R1-124012) captured the definition of a CSI process in Section 7.2, as follows: UE 116 in transmission mode 10 can be configured with one or more CSI processes per serving cell by higher layers. Each CSI process is associated with a CSI-RS resource defined in Section 7.2.5 and a CSI-interference measurement (CSI-IM) resource (defined in Section 7.2.6). A CSI reported by UE 116 corresponds to a CSI process configured by higher layers.

In RAN1#70bis, the support of the feedback configuration and reporting for simultaneous CA and CoMP was agreed. Then, the question may arise whether a CSI process definition should be extended to cover Rel-8/9/10 CSI feedback configurations or not. This is because a UE may not be configured with TM10 for all the configured serving cells.

If the CSI process definition is not extended to cover Rel-8/9/10 feedback, then the agreement on the aperiodic CSI triggering TABLE applies only for the serving cells configured with TM10, and the UE cannot simultaneously feedback Rel-8/9/10 type CSI and Rel-11 type CSI (based on CSI processes) on one PUSCH. This possibly restricts flexibility of the TM configuration across cells.

Alternatively, if the CSI process definition is extended to cover Rel-8 and Rel-10 feedback as well, UE 116 can simultaneously feedback Rel-8/9/10 (or legacy) type CSI (associated with TMs 1-9) and Rel-11 CSI (associated with TM10) type on one PUSCH. This assumes that UE 116 can be configured with different TMs in different serving cells.

Alternatively, for simplifying the feedback configuration and UE operation, the following TM configuration restriction may be imposed for Rel-11 UEs: When an R11 UE is configured with TM 10 in one DL serving cell, the UE can only be configured with TM10 in all the other DL serving cells; When an Rel-11 UE is configured with TMs 1-9 in one DL serving cell, the UE can only be configured with TMs 1-9 in all the other DL serving cells.

For facilitating flexible TM configuration across cells and at the same time to support multiplexing of corresponding aperiodic CSI on PUSCH, it is proposed to extend the definition of CSI process to encompass Rel-8/9/10 CSI feedback configuration. In Rel-10, RRC information elements for Rel-10, for example, Rel-10 CQI-ReportConfig information elements (e.g. CQI-ReportConfig-r10, CQI-ReportConfigS-Cell-r10), are configured per serving cell, for configuring CSI feedback of the serving cell.

3GPP 36.331 v10.5.0, incorporated into the present disclosure as if fully set forth herein, captures release-dependent variants of CQI-ReportConfig, which are CQI-ReportConfig, CQI-ReportConfig-v920, CQI-ReportConfig-r10, CQI-ReportConfigScell-r10, as follow:

2-bit CSI request field will be used in DCI format 0 if in UE Specific Search space (UE-SS) and DCI format 4 for triggering of aperiodic CoMP feedback.

In RAN1#70bis, the support of the feedback configuration and reporting for simultaneous CA and CoMP was agreed, and hence one clarification should be made on the meaning of "multiple CSIs" in the agreement of RAN1#69. As the agreement was made before the definition of the CSI process is agreed, the "multiple CSIs" in the agreement appears to imply "multiple CSI processes", now that the introduction of the CSI process has been agreed.

In addition, the 36.212 CR captures the following for the 2-bit CSI request agreed in Rel-11: CSI request—1 or 2 bits as defined in section 7.2.1 of REF3. The 2-bit field applies to UEs that are configured with more than one DL cell, or UEs that are configured by higher layers to report more than one aperiodic CSI; otherwise the 1-bit field applies.

```
CQI-ReportConfig ::=   SEQUENCE {
    cqi-ReportModeAperiodic   CQI-ReportModeAperiodicOPTIONAL,    -- Need OR
    nomPDSCH-RS-EPRE-Offset    INTEGER (-1..6),
    cqi-ReportPeriodic    CQI-ReportPeriodic    OPTIONAL        -- Need ON
}
CQI-ReportConfig-v920 ::=      SEQUENCE {
    cqi-Mask-r9           ENUMERATED {setup}    OPTIONAL,    --     Cond
cqi-Setup
    pmi-RI-Report-r9    ENUMERATED {setup}    OPTIONAL    -- Cond PMIRI
}
CQI-ReportConfig-r10 ::= SEQUENCE {
    cqi-ReportAperiodic-r10           CQI-ReportAperiodic-r10       OPTIONAL,
    -- Need ON
    nomPDSCH-RS-EPRE-Offset           INTEGER (-1..6),
    cqi-ReportPeriodic-r10            CQI-ReportPeriodic-r10        OPTIONAL, --
Need ON
    pmi-RI-Report-r9                  ENUMERATED {setup}            OPTIONAL,
    -- Cond PMIRIPCell
    csi-SubframePatternConfig-r10     CHOICE {
        release                       NULL,
        setup                         SEQUENCE {
            csi-MeasSubframeSet1-r10      MeasSubframePattern-r10,
            csi-MeasSubframeSet2-r10      MeasSubframePattern-r10
        }
    }                                 OPTIONAL    -- Need
ON
}
CQI-ReportConfigSCell-r10 ::=         SEQUENCE {
    cqi-ReportModeAperiodic-r10        CQI-ReportModeAperiodic OPTIONAL,
    -- Need OR
    nomPDSCH-RS-EPRE-Offset-r10        INTEGER (-1..6),
    cqi-ReportPeriodicSCell-r10        CQI-ReportPeriodic-r10        OPTIONAL,
    -- Need ON
    pmi-RI-Report-r10                  ENUMERATED {setup}            OPTIONAL
    -- Cond PMIRISCell
}
```

According to a first extension protocol in certain embodiments of the present disclosure, the definition of CSI process is extended to encompass the CSI feedback configuration for TMS 1-9 as well as CSI feedback configuration(s) for TM10.

One example revision for Section 7.2 of 3GPP TS 36.213 to allow feedback aperiodic CSI on multiple cells configured with different TMs is: UE 116 can be configured with one or more CSI processes per serving cell by higher layers. Each CSI process is associated either with a CSI-RS resource defined in Section 7.2.5 and a CSI-interference measurement (CSI-IM) resource defined in Section 7.2.6 for TM10, or with a CQI (or CSI) reporting configuration (CQI-ReportConfig) for TMs 1-9. A CSI reported by UE 116 corresponds to a CSI process configured by higher layers.

In RAN1#69, the introduction of a 2-bit CSI request for CoMP was agreed as follows: in the case of a single CC configuration where multiple CSIs are configured for COMP, Now, in case the definition of CSI process is extended as in the first extension proposal, in both of CA and CoMP cases, UE 116 will be configured with more than one CSI processes, and hence the agreement can be extended as follows: when more than one CSI process is configured, 2-bit CSI request field will be used in DCI format 0 (if in UE SS) and DCI format 4.

In this case, CSI request can be 1 or 2 bits as defined in section 7.2.1 of REF 3. The 2-bit field applies to UEs that are configured by higher layers to report aperiodic CSI on more than one CSI process; otherwise the 1-bit field applies.

Alternatively, when the definition of CSI process is not extended, the following two alternatives of extending the agreement can be considered.

Firstly, when total number of configured CSI processes in the configured DL serving cells is more than one, 2-bit CSI request field will be used in DCI format 0 (if in UE SS) and DCI format 4. In this case, the new CSI triggering TABLE will be used for UE 116 that is configured with more than one DL serving cell even if UE 116 is configured with one CSI process per serving cell. This may increase RRC signaling overhead to configure an additional unnecessary CSI triggering TABLE. In Alt 2, the new CSI triggering table will be configured only when necessary.

Secondly, when number of configured CSI processes in at least one serving cell is more than one, 2-bit CSI request field will be used in DCI format 0 (if in UE SS) and DCI format 4. For example, the following modification can capture this alternative: CSI request—1 or 2 bits as defined in section 7.2.1 of REF3. The 2-bit field applies to: UEs that are configured with more than one DL cell, and UEs that are configured by higher layers to report aperiodic CSI on more than one CSI process in at least one serving cell; otherwise the 1-bit field applies.

3GPP TS 36.213 CR Section 7.2.1 captures the following for the 2-bit CSI trigger: If the CSI request field size is 2 bits and UE 116 is configured in transmission mode 1-9, a report is triggered according to the value in below TABLE 7 of CSI Request fields for PDCCH/EPDCCH with uplink DCI format in UE specific search space, corresponding to aperiodic CSI reporting.

TABLE 7

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

Further, if the CSI request field size is 2 bits in REF4 and UE 116 is configured in transmission mode 10, a report is triggered according to the value in below TABLE 8 of CSI Request field for PDCCH/EPDCCH with uplink DCI format in UE specific search space, corresponding to aperiodic CSI reporting.

TABLE 8

| Value of CSI request field | Description |
| --- | --- |
| '00' | No aperiodic CSI report is triggered |
| '01' | Aperiodic CSI report is triggered for a set of CSI process(es) configured by higher layers for serving cell c |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

It is noted that the text in the Change Request (CR) does not seem to reflect the previous agreement of CSI triggering bit configuration, where the configuration of the new table is associated with number of CSI processes in the serving cell, rather than the configured TM. Furthermore, the current text in the CR can be read that in each subframe UE 116 has to first consider a TM of serving cell c, to select a table out of the two tables to determine CSIs to transmit on the scheduled PUSCH. RAN1 have not had a clear agreement on this aspect, and a clarification seems to be necessary.

There can be two alternatives for a UE to interpret the 2-bit CSI request trigger in case CA and CoMP is configured. In the first interpretation, the contents of aperiodic CSI are determined according to a single table, irrespective of the TM of the serving cell c. In the second interpretation, the contents of aperiodic CSI are determined according to one selected table out of the two tables, where the selection is dependent upon the TM of a serving cell c.

For example, consider that UE 116 is configured with two serving cells, a primary cell (Pcell) and a secondary cell (Scell). UE 116 is configured with TM 10 in a Pcell and one of TMs 1-9 in a Scell. When a DCI format 0/4 transmitted in a Pcell triggers an aperiodic CSI report, UE 116 uses TABLE 7 to determine the CSI reporting content, as a Pcell is configured with TM10.

Alternatively, when a DCI format 0/4 transmitted in a Scell triggers an aperiodic CSI report, UE 116 uses TABLE 8 to determine the CSI reporting contents, as Scell is configured with TMs 1-9. Similar examples can be considered for any number of configured serving cells.

For simplicity of the UE implementation, the first interpretation is preferred over the second interpretation. Furthermore, when the CSI process definition is extended according to the first extension proposal, and when there is no dynamic switching of CSI triggering tables as in the first interpretation, TABLE 7 does not seem to be needed any more, and TABLE 8 can capture the RAN1 agreement in Rel-11 as well as the R10 carrier aggregation operation. Here, one clarification may be needed on the meaning of "a set of CSI process(es) configured by higher layers for serving cell c" for codepoint '01'. In case a legacy type CSI process is configured for serving cell c, "a set of CSI process(es) configured by higher layers for serving cell c" shall be the legacy type CSI process.

In the second extension proposal in certain embodiments of the present disclosure, the contents of aperiodic CSI are determined according to TABLE 8, irrespective of the TM of the serving cell c, in all the cases of CA, CA+CoMP, or CoMP.

In this case, the standard text could be: If the CSI request field size is 2 bits in REF 4, a report is triggered according to the value in TABLE 8 corresponding to aperiodic CSI reporting.

In one example (EX-RRC) of the higher layer signaling in TABLE 7.2.1-1 above, when carrier aggregation is configured to UE 116, serving cells configured with TMs 1-9 can be configured by RRC with a Rel-10 aperiodic CSI trigger (i.e. aperiodicCSI-Trigger-r10, common configuration for all serving cells) and serving cells configured with TM10 can be configured by RRC with a Rel-11 aperiodic CSI trigger which is configured per CSI process, e.g. as illustrated below.

CSI-Process Information Elements:

```
-- ASN1START
CSI-Process-r11 ::=    SEQUENCE {
    csi-ProcessIdentity-r11      CSI-ProcessIdentity-r11,
    csi-RS-Identity-r11          CSI-RS-Identity-r11,
    csi-IM-Identity-r11          CSI-IM-Identity-r11,
    p-C-List-r11                 SEQUENCE (SIZE (1..2)) OF P-C-r11,
    antennaInfoDedConfigId-r11   AntennaInfoDedConfigId-r11,
    cqi-ReportPeriodicExtId-r11  CQI-ReportPeriodicExtId-r11,
```

```
    ri-Ref-CSI-ProcessId-r11    CSI-ProcessIdentity-r11,
    cqi-ReportAperiodicPS-r11   CQI-ReportAperiodicPS-r11,
    pmi-RI-Report-r11           ENUMERATED {setup}       OPTIONAL,   --
Need OR
    ...
}
P-C-r11 ::=        INTEGER (-8..15)
-- ASN1STOP
CQI-ReportConfig information elements
CQI-ReportAperiodic-r10 ::=  CHOICE {
    release                    NULL,
    setup                      SEQUENCE {
        cqi-ReportModeAperiodic-r10    CQI-ReportModeAperiodic,
        aperiodicCSI-Trigger-r10       SEQUENCE {
            trigger1-r10               BIT STRING (SIZE (8)),
            trigger2-r10               BIT STRING (SIZE (8))
        }                                          OPTIONAL  -- Need OR
    }
}
CQI-ReportAperiodicPS-r11 ::=  CHOICE {
    release                    NULL,
    setup                      SEQUENCE {
        cqi-ReportModeAperiodic-r10    CQI-ReportModeAperiodic,
        trigger01-r11       BOOLEAN,
        trigger10-r11       BOOLEAN,
        trigger11-r11       BOOLEAN
}
```

For the Rel-11 aperiodic CSI triggering, the fields trigger01-r11, trigger10-r11 and trigger11-r11 correspond to codepoint 01, 10 and 11, respectively, for the 2-bit aperiodic CSI request field in DCI format 2D (or other reference DCI format) for TM10. When a field (corresponding to a codepoint) of the Rel-11 aperiodic CSI trigger is set to true, it indicates that the CSI process shall be reported in the aperiodic CSI report when the codepoint is signaled in the DCI format.

The UE 116 behavior according to the example RRC signaling given above (EX-RRC) is as follows: when aperiodic CSI reporting is triggered for codepoint 10 or codepoint 11, UE 116 assumes that the serving cells that are configured with TMs 1-9 with the corresponding bits that are set in the bitmap for respective trigger1-r10 or trigger1-r11 of aperiodicCSI-Trigger-r10 are included in the aperiodic CSI reporting. In addition, UE 116 assumes that for the serving cells configured with TM10, the CSI processes configured for codepoint 10 or codepoint 11, reporting via the Rel-11 aperiodic CSI reporting trigger configuration is also included in the aperiodic CSI reporting.

In first configuration option, aperiodic CSI-Trigger can indicate for which serving cell(s) the aperiodic CSI report is triggered when one or more SCells are configured. Trigger1 corresponds to the CSI request field '10' and trigger2 corresponds to the CSI request field '11'. Also, the Rel-10 aperiodic CSI trigger field description can be modified as above (see 3GPP TS 36.213, TABLE 7.2.1-1A).

In the first configuration option, the leftmost bit, bit 0 in the bit string corresponds to the cell with ServCellIndex=0 and bit 1 in the bit string corresponds to the cell with ServCellIndex=1 and the like. Each bit has either value 0 meaning no aperiodic CSI report is triggered, or value 1 meaning the aperiodic CSI report is triggered. At most 5 bits can be set to value 1 in the bit string. E-UTRAN only configures value 1 for cells configured with TransmissionMode (TM) set in range TM1 to TM9. One value applies for all serving cells configured with transmissionmode set in range TM1 to TM9 and the associated functionality is common, i.e., not performed independently for each cell. In first configuration option, EUTRAN will set the bits in trigger1 or trigger2 corresponding to cells configured with TM10 to be zero.

In second configuration option, UE 116 treats a bit in the bitmap of the Rel-10 aperiodic CSI trigger as 'don't care' if the bit corresponds to a cell that is configured with TM10.

In third configuration option, the bit corresponds to a cell that is configured with TM10 has to be set as one by the network if the network wants UE 116 to read the Rel-11 aperiodic CSI reporting trigger and decide which CSI process to report accordingly; if the bit is set to zero, UE 116 ignores the Rel-11 aperiodic CSI reporting trigger configuration for that cell and does not transmit the Rel-11 aperiodic CSI for that cell.

Alternatively, when the CSI process definition does not change, the following modification can capture the understanding: If the CSI request field size is 2 bits [4] and UE 116 is configured with at most one CSI process per serving cell, a report is triggered according to the value in TABLE 7.2.1-1A corresponding to aperiodic CSI reporting. If the CSI request field size is 2 bits [4] and UE 116 is configured with more than one CSI process in at least one serving cell, a report is triggered according to the value in TABLE 7.2.1-1B corresponding to aperiodic CSI reporting.

In various embodiments, only one of the reports may be sent and remaining reports may be dropped (i.e., not transmitted) in case of collision among PUCCH reports for different CSI-RS resources. In this situation, dropping rules are defined, which are known to both UE 116 and eNB 102. The periodic CSI dropping rules are supported based on the parameters including reporting type and CSI process/CC index in certain sequences. It is well known that the CSI process index or the CC index can have zero or a positive integer.

Two dropping rules are considered. A first dropping rule drops collided CSI reports based on in a sequence of reporting type, CSI process index and CC index (Reporting type→CSI process index→CC index); a second dropping rule drops collided CSI processes based on in a sequence of reporting type, CC index and CSI process index (Reporting type→CC index→CSI process index).

For the reporting type, in certain embodiments, the dropping rules prioritize an RI report over a CQI/PMI reports, and a wideband CQI/PMI report. For CSI process index, in certain embodiments, the dropping rules prioritize a CSI report with a lower CSI process index. For CC index, in certain embodiments, the dropping rules prioritize a CSI report with a lower CC index.

For example, according the first dropping rule, in a case where a CSI process P1 (CC index=ServcellID=0, CSI process ID=1) and the CSI process S0 (CC index=ServcellID=1, CSI process ID=0) collide, the CSI process for S0 is transmitted and the CSI process for P1 is dropped (P1, S0 collision→S0 is transmitted). In contrast, according to the second dropping rule, in the case where the CSI processes for P1 and the S0 collide, the CSI process P1 is transmitted and S0 is dropped (P1, S0 collision→P1 is transmitted). In the case where the CSI processes for P0 (CC index=ServcellID=0, CSI process ID=0) and the S0 collide, the CSI process P0 is transmitted and S0 is dropped regardless of the first or second dropping rule applied (P0, S0 collision→P0 is transmitted).

In RAN1#70, the first dropping rule was agreed for periodic CSI dropping rule. The 36.213 CR captures the tie-breaking part of the agreement in Section 7.2.2 as in the following. For a given subframe and UE in transmission modes 1-9, in case of collision between CSI reports of different serving cells with PUCCH reporting type of the same priority, the CSI of the serving cell with lowest ServCellIndex is reported, and CSI of all other serving cells are dropped.

For a given subframe and UE in transmission mode 10, in case of collision between CSI reports of different serving cells with PUCCH reporting type of the same priority and the CSI reports corresponding to CSI processes with same CSIProcessIndex, the CSI reports of all serving cells except the serving cell with lowest ServCellIndex are dropped.

For a given subframe and UE in transmission mode 10, in case of collision between CSI reports of different serving cells with PUCCH reporting type of the same priority and the CSI reports corresponding to CSI processes with different CSIProcessIndex, the CSI reports of all serving cells except the serving cell with CSI reports corresponding to CSI process with the lowest CSIProcessIndex are dropped.

The current description appears to assume that UE 116 is configured with only one type of TM across all the serving cells. For flexible TM configuration across serving cells, the TM dependency should be removed from the description.

One embodiment for capturing that the CSI process definition is extended to cover the legacy type of CSI processes as in the first extension proposal is as in the following. In case of collision between CSI reports of different serving cells with PUCCH reporting type of the same priority and the CSI reports corresponding to CSI processes with the same CSIProcessIndex, the CSI reports of all serving cells except the serving cell with the lowest ServCellIndex are dropped.

In case of collision between CSI reports of different serving cells with PUCCH reporting type of the same priority and the CSI reports corresponding to CSI processes with different CSIProcessIndex, the CSI reports of all serving cells except the serving cell with CSI reports corresponding to CSI process with the lowest CSIProcessIndex are dropped; and Here, CSIProcessIndex for any CSI process associated with TMs 1-9 is 1.

Figure 5:
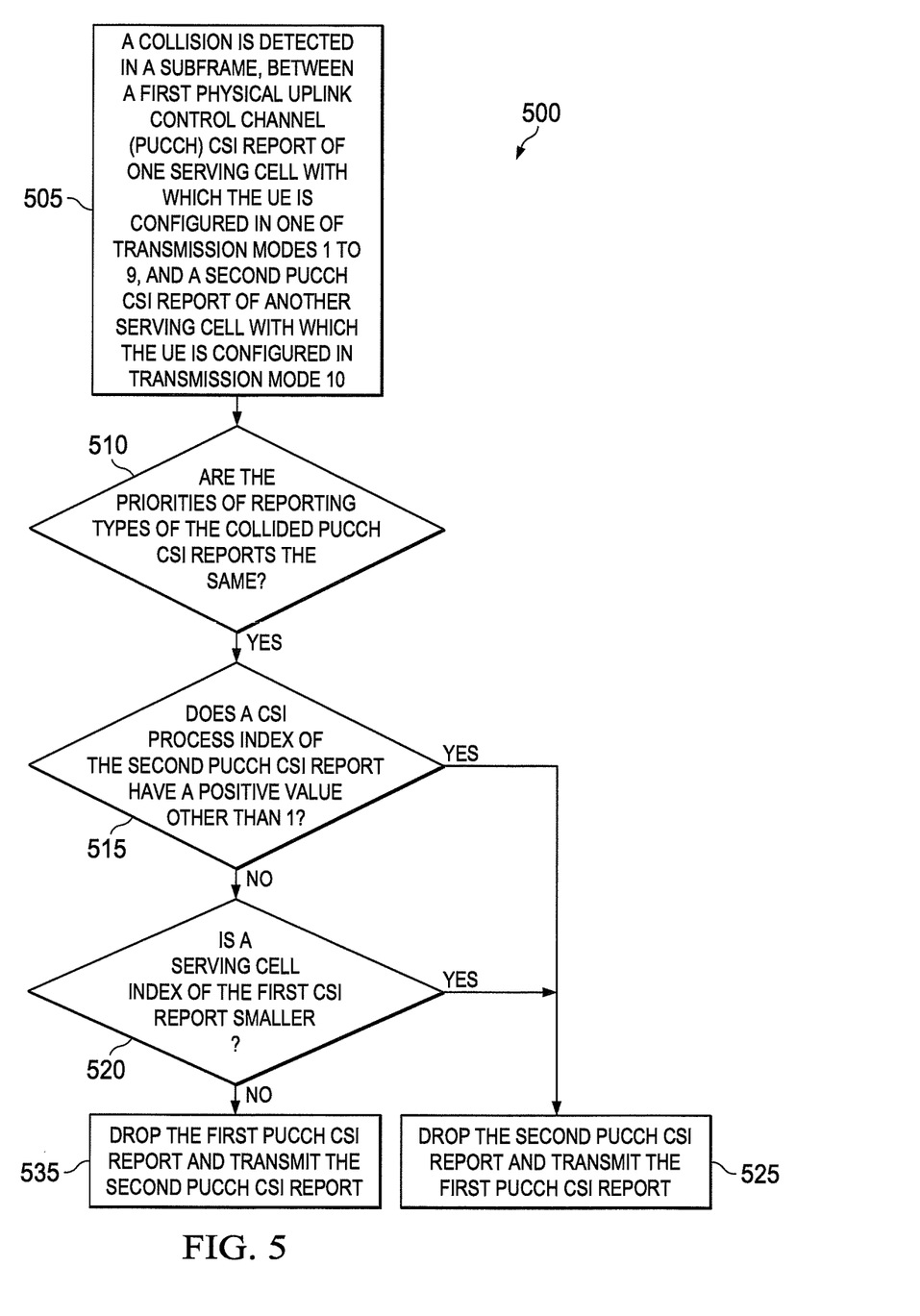
FIG. 5 is a flowchart illustrating a tie-breaking operation in case of collision between CSI reports of different serving cells according to embodiments of the present disclosure.

FIG. 5 is a flowchart 500 illustrating a tie-breaking operation in case of collision between CSI reports of different serving cells according to embodiments of the present disclosure. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The operation depicted in the example depicted is implemented by processing circuitry in a UE.

In operation 505, the UE detects a collision in a subframe, between a first Physical Uplink Control Channel (PUCCH) CSI report of one serving cell with which the UE is configured in one of transmission modes 1 to 9, and a second PUCCH CSI report of another serving cell with which the UE is configured in transmission mode 10. Then, if the priorities of reporting types of the collided PUCCH CSI reports are the same in operation 510, the UE prioritizes a legacy type of CSI process over Rel-11 type CSI process in operation 525 unless Rel-11 type CSI process has CSIProcessIndex=1 in operation 515; alternatively, if a serving cell index of the first CSI report is smaller in operation 520, the UE drops the first PUCCH CSI report and transmit the second PUCCH CSI report in operation 535.

As an example, UE 116 is assumed to be configured with a legacy CSI process is configured in a Scell, and two Rel-11 type CSI processes in a Pcell (CSIProcessIndex=1, 2). When the legacy CSI process in a Scell and Rel-11 type CSI process with CSIProcessIndex=2 in a Pcell are scheduled to be reported in the same subframe, only the legacy CSI report will be transmitted and the Rel-11 CSI report will be dropped. Alternatively, when the legacy CSI process in a Scell and Rel-11 type CSI process with CSIProcessIndex=1 in a Pcell are scheduled to be reported in the same subframe, the tie-breaking step associated with the CSI process index will declare a tie, as Rel-11 type CSI has CSIProcessIndex=1. In the following step associated with CC index, the Pcell is prioritized; hence only the Rel-11 CSI will be transmitted and the legacy CSI will be dropped.

In another option, a default CSIProcessIndex for the legacy type of CSI processes is introduced to be the smallest possible CSI process number (e.g., CSIProcessIndex=1 is assumed for legacy type of CSI process, for the priority handling purpose in periodic CSI dropping) in order to prioritize legacy CSI transmission over Rel-11 CSI transmissions in case CSI of higher-numbered CSI process is triggered for the serving cells configured with TM 10. Having this prioritization, a legacy CSI process will not be dropped over a secondary CSI process for a serving cell configured with TM 10.

In still another option, in the tie-breaking operation associated with the CSI process index, UE 116 prioritizes a legacy type of CSI process over Rel-11 type CSI process. For example, consider UE 116 configured with a legacy CSI process is configured in a Scell, and two Rel-11 type CSI processes in a Pcell (CSIProcessIndex=1,2). When the legacy CSI in a Scell and any of Rel-11 type CSI in a Pcell are scheduled in the same subframe, only the legacy CSI will be transmitted and the Rel-11 CSI will be dropped.

In the RAN1 rapporteur after RAN1#70, a working copy of the 36.213 CR suggested the following for UCI-only triggering in case that a CSI report on more than one CSI process is triggered: For $29 \leq I_{MCS} \leq 31$, if DCI format 0 is used and $I_{MCS}=29$ or, if DCI format 4 is used and only 1 TB is enabled and $I_{MCS}=29$ for the enabled TB and the number of transmission layers is 1, and if the "CSI request" bit field is 1 bit and is set to trigger an aperiodic CSI report and $N_{PRB} \leq 4$, or the "CSI request" bit field is 2 bits and is triggering an aperiodic CSI report for one serving cell according to TABLE 7.2.1-1A, and, $N_{PRB} \leq 4$ or, the "CSI request" bit field is 2 bits and is triggering aperiodic CSI report for more than one serving cell according to TABLE 7.2.1-1A and, $N_{PRB} \leq 20$, the "CSI request" bit field is 2 bits and is triggering an aperiodic CSI report for more than one CSI according to TABLE 7.2.1-1B and, $N_{PRB} \leq 20$, then there is no transport block for the UL-SCH and only the control information feedback for the current PUSCH reporting mode is transmitted by UE 116.

In addition, RAN1#70bis has agreed on the maximum number of CSI processes per serving cell: the max number of CSI processes, P, is a UE capability for TM10-capable UEs {1, 3, 4}. Having the agreement, the total number of CSI processes which one aperiodic CSI report is triggered for, is determined by the UE capability, and the total number can be as large as 4*5=20 processes.

Reminding that the 20 PRBs for the upper limit of the number of PRBs to trigger UCI-only PUSCH in Rel-10 was considering a CSI report on 5 CCs, 20 PRBs are not sufficient to ensure reliable decoding of UCI-only PUSCH in case a report on 20 CSI processes is triggered. To determine the threshold number of PRBs, the following approaches are considered.

In the first alternative, a UCI-only PUSCH is triggered when the "CSI request" bit field is 2 bits and is triggering an aperiodic CSI report for more than one CSI process according to TABLE 7.2.1-1B. The first alternative gets rid of the upper limit of PRBs to trigger a UCI-only PUSCH. In case the system bandwidth is 100 PRBs, there will not be decoding reliability issue for the UCI-only PUSCH regardless of the number of CSI processes and the number of configured serving cells. However, Alt 1 effectively makes it impossible to use one redundancy version of HARQ (rv=1).

In the second alternative, a UCI-only PUSCH is triggered when the "CSI request" bit field is 2 bits and is triggering an aperiodic CSI report for more than one CSI process according to TABLE 7.2.1-1B and $N_{PRB} \leq 8P$. The second alternative assumes that UE 116 can be configured with at most 2 cells in most of the scenarios, and it ensures that the UCI-only PUSCH can be transmitted without decoding reliability issue by allowing configuration of 4·2P, where P∈{1, 3, 4}. It is noted that even in the case where the UE is configured with more than 2 cells, eNB 102 can restrict the number of CSI processes for a UCI-only PUSCH by implementation, so that the number of CSI processes does not exceed 2P.

In the third alternative, a UCI-only PUSCH is triggered when the "CSI request" bit field is 2 bits and is triggering an aperiodic CSI report for more than one CSI process according to TABLE 7.2.1-1 and $N_{PRB} \leq \max\{20,8P\}$. The third alternative assumes that UE 116 can be configured with at most 2 cells in most of the scenarios, and it ensures that the UCI-only PUSCH can be transmitted without decoding reliability issue by allowing configuration of 4·2P, where P∈{1, 3, 4}. It increases the number of PRBs only when the legacy number of PRBs (which is 20) has a potential issue of having high code rate. It is noted that even in the case where UE 116 is configured with more than 2 cells, eNB 102 can restrict the number of CSI processes for a UCI-only PUSCH by implementation, so that the number of CSI processes does not exceed 2P.

In general, 8P in the second and third approaches can be generalized into $4P \cdot C_{max}$, where $C_{max}$ is the maximum number of CCs, which can be pre-determined to be a certain value (e.g., 2 (typical network's number of CCs) or 5 (maximum possible number of CCs in the LTE specification)), or it can dependent upon a UE capability (e.g., whether a UE supports carrier aggregation or not; when supports C CCs, $C_{max}=C$, when does not support, $C_{max}=1$).

One possible example for the third approach can be: For $29 \leq I_{MCS} \leq 31$, if DCI format 0 is used and $I_{MCS}=29$ or, if DCI format 4 is used and only 1 TB is enabled and $I_{MCS}=29$ for the enabled TB and the number of transmission layers is 1, and if the "CSI request" bit field is 1 bit and is set to trigger an aperiodic CSI report and $N_{PRB} \leq 4$, or the "CSI request" bit field is 2 bits and is triggering an aperiodic CSI report for one CSI process according to TABLE 7.2.1-1, and, $N_{PRB} \leq 4$ or, the "CSI request" bit field is 2 bits and is triggering aperiodic CSI report for more than one CSI process to TABLE 7.2.1-1 and, $N_{PRB} \leq \max\{20,8P\}$, then there is no transport block for the UL-SCH and only the control information feedback for the current PUSCH reporting mode is transmitted by UE 116.

In RAN1#70bis, the following was agreed on the RI reference process. For aperiodic feedback, when a reference process is configured, A RI-reference-process can be configured for a CSI process. The RI of the process can be configured to inherit its value from the RI reported in the same subframe of the RI-reference-process. Further, The RI computation for a first CSI process, without a reference CSI process, is derived solely based on the first CSI process, it does not take into account any other CSI processes, regardless if a second CSI process has been configured with the first CSI process as a reference CSI process.

Further, for aperiodic feedback, when a reference process is configured: a CSI process should be configured for the same CC as the reference CSI process; there is no rank signaling compression; and a CSI Process with reference CSI Process can only be triggered in a subframe in which the reference CSI Process is also triggered; UE 116 is not expected to receive triggering commands that is not compliant with the above condition.

In this agreement, up to one RI per CC can be transmitted on a PUSCH, and hence the RI(s) can be multiplexed on the PUSCH as in the same way as in Rel-10.

Meanwhile, the coding method for CQI/PMIs corresponding to multiple CSI processes need to be determined. Extending carrier aggregation in Rel-10, a joint coding across all the CQI/PMIs will be preferred. To determine the order of the multiple CQI/PMIs, it is supposed that a PUSCH triggering can be for C cells, where a CSI report on cell c is for Xc CSI processes. Then, a natural way to extend the carrier aggregation in Rel-10 will be placing CQI/PMIs sequentially in an ascending order of the CSI process numbers in each serving cell, starting from a lowest numbered serving cell to the highest.

In certain embodiments according to the present disclosure, to keep the commonality with Rel-10 carrier aggregation, aperiodic CQI/PMI for CoMP is multiplexed on a PUSCH as follows: a joint coding is applied for all the CQI/PMIs multiplexed on the PUSCH; CQI/PMI information bits to enter the channel coding block are placed sequentially in an ascending order of the CSI process numbers in each serving cell, starting from a lowest numbered serving cell to the highest.

In RAN1#70bis, the following was agreed for the UE-complexity control: a CSI reference resource for a CSI process is determined as follows for both periodic and aperiodic reporting: for the case of 1 configured CSI process (on the associated CC), the CSI reference resource is determined as in Rel-10, otherwise, for both periodic and aperiodic CSI reporting in subframe N, the CSI reference resource of the CSI process is the first valid CSI reference resource occurring on or prior to subframe N-x: in case of subframe sets being configured, the subframe set selection is still based on the subframe containing the CSI request; for periodic CSI reporting, the subframe set selection is unchanged from the Rel-10 definition. It limits the worst case processing complexity for aperiodic feedback by specifying that, in case of multiple CSI requests exceeding X unreported aperiodic CSI processes, UE 116 is not expected to update the CSI processes exceeding X, counting upwards from the lowest indexed CSI process, corresponding to the latest CSI request: the max number of CSI processes, P, is a UE capability for TM10-capable UEs {1, 3, 4}, X=P; x=5 for FDD; x is FFS for TDD, between 4 and/or 5; support of UEs with max 1 CSI process, with IMR and Rel-11 QCL behavior is contained in TM10 with UE capability limiting the number of CSI processes, or introduces IMR and Rel-11 QCL behavior for a new UE capability in TM9; no support for IMR/QCL behaviour unless UEs support 3 or 4 CSI processes.

In this agreement, the maximum number of CSI processes, Y, for which an aperiodic CSI reporting reports in case of carrier aggregation is determined based upon the UE capability:

$$Y = \sum_{c=1}^{C} y_c,$$

Here, $y_c$ is the max number of CSI processes for a component carrier (CC) c, and C is the number of configured CCs. In some embodiments, $y_c=y$, for all c=1, ..., C.

It can be also contemplated that various combinations or sub-combinations of the specific features and aspects of the embodiments may be made and still fall within the scope of the appended claims. For example, in some embodiments, the features, configurations, or other details disclosed or incorporated by reference herein with respect to some of the embodiments are combinable with other features, configurations, or details disclosed herein with respect to other embodiments to form new embodiments not explicitly disclosed herein. All of such embodiments having combinations of features and configurations are contemplated as being part of the present disclosure. Additionally, unless otherwise stated, no features or details of any of the stent or connector embodiments disclosed herein are meant to be required or essential to any of the embodiments disclosed herein, unless explicitly described herein as being required or essential.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting Channel State Information (CSI) report in a wireless network where a plurality of cells is configured to cooperate for a User Equipment (UE) with Carrier aggregation (CA), the method comprising:
    detecting a collision in a subframe, between a first Physical Uplink Control Channel (PUCCH) CSI report of one serving cell with which the UE is configured in one of transmission modes 1 to 9, and a second PUCCH CSI report of another serving cell with which the UE is configured in transmission mode 10;
    comparing the priorities of reporting types of the collided PUCCH CSI reports; and
    upon the reporting types of the collided PUCCH CSI reports having a same priority, transmitting the first PUCCH CSI report if a CSI process index of the second PUCCH CSI report has a positive value other than 1.

2. The method of claim 1, further comprising:
    dropping the PUCCH CSI report(s) with a higher serving cell index(es) other than the PUCCH CSI report with the lowest serving cell index if the CSI process index of the second CSI report is equal to 1.

3. The method of claim 1, further comprising:
    dropping the second PUCCH CSI report of another serving cell with which the UE is configured in transmission mode 10.

4. An apparatus for transmitting Channel State Information (CSI) report in a wireless network where a plurality of cells is configured to cooperate for a User Equipment (UE) with Carrier aggregation (CA), the apparatus comprising a processing circuitry configured to:
    detect a collision in a frame, between a first Physical Uplink Control Channel (PUCCH) CSI report of one serving cell with which the UE is configured in one of transmission modes 1 to 9, and a second PUCCH CSI report of another serving cell with which the UE is configured in transmission mode 10;
    compare the priorities of reporting types of the collided PUCCH CSI reports; and
    upon the reporting types of the collided PUCCH CSI reports having a same priority, transmit the first PUCCH CSI report if the CSI process index of the second PUCCH CSI report has a positive value other than 1.

5. The apparatus of claim 4, wherein the processing circuitry is further configured to:
    drop the PUCCH CSI report(s) with a higher serving cell index(es) other than the PUCCH CSI report with the lowest serving cell index if the CSI process index of the second CSI report is equal to 1.

6. The apparatus of claim 4, wherein the processing circuitry is further configured to:
    drop the second PUCCH CSI report of another serving cell with which the UE is configured in transmission mode 10.

7. An apparatus for receiving Channel State Information (CSI) report in a wireless network where a plurality of cells is configured to cooperate for a User Equipment (UE) with Carrier aggregation (CA), the apparatus comprising a processing circuitry configured to:
    detect a collision in a frame, between a first Physical Uplink Control Channel (PUCCH) CSI report of one serving cell with which the UE is configured in one of transmission modes 1 to 9, and a second PUCCH CSI report of another serving cell with which the UE is configured in transmission mode 10;
    compare the priorities of reporting types of the collided PUCCH CSI reports; and
    upon the reporting types of the collided CSI reports having a same priority, configure the UE to transmit the first PUCCH CSI report if the CSI process index of the second PUCCH CSI report has a positive value other than 1.

8. The apparatus of claim 7, wherein the processing circuitry is further configured to:
    receive a PUCCH CSI report with a smaller serving cell index between the first and the second CSI reports if the CSI process index of the second CSI report is equal to 1.

9. The apparatus of claim 7, wherein the processing circuitry is further configured to:
    configure the UE to drop the second PUCCH CSI report of another serving cell with which the UE is configured in transmission mode 10.

10. A method for receiving Channel State Information (CSI) report in a wireless network where a plurality of cells is configured to cooperate for a User Equipment (UE) with Carrier aggregation (CA), the method comprising:
    detecting a collision in a frame, between a first Physical Uplink Control Channel (PUCCH) CSI report of one serving cell with which the UE is configured in one of transmission modes 1 to 9, and a second PUCCH CSI report of another serving cell with which the UE is configured in transmission mode 10;

comparing the priorities of reporting types of the collided PUCCH CSI reports; and upon the reporting types of the collided PUCCH CSI reports having a same priority, configuring the UE to transmit the first PUCCH CSI report if the CSI process index of the second PUCCH CSI report has a positive value other than 1.

11. The method of claim 10, wherein the processing circuitry is further configured to:

drop the PUCCH CSI report(s) with a higher serving cell index(es) other than the PUCCH CSI report with the lowest serving cell index if the CSI process index of the second CSI report is equal to 1.

12. The method of claim 10, wherein the processing circuitry is further configured to:

configure the UE to drop the second PUCCH CSI report of another serving cell with which the UE is configured in transmission mode 10.

13. A method for receiving Channel State Information (CSI) report in a wireless network where a plurality of cells is configured to cooperate for a User Equipment (UE) with Carrier aggregation (CA), the method comprising:

configuring, via a higher layer, the UE configured in transmission mode 10 whether to create a respective CSI report(s) for each aperiodic CSI process or not, using an information element including at least three one-bit variables, wherein the at least three one-bit variables include a trigger01-r11 corresponding, to a state '01' of a CSI request field, a trigger10-r11 corresponding to a state '10' of the CSI request field, and a trigger11-r11 corresponding to a state '11' of the CSI request field, and wherein the CSI request field is conveyed in a uplink DCI format that schedules a Physical Uplink Shared CHannel (PUSCH) for a serving cell.

14. The method of claim 13, wherein the state '01' indicates that aperiodic CSI report is triggered for a set of CSI process(es) configured by the higher layer, the state '10' indicates that aperiodic CSI report is triggered for a first set of CSI process(es) configured by the higher layer, and the state '11' indicates that aperiodic CSI report is triggered for a second set of CSI process(es) configured by the higher layer.

15. The method of claim 13, wherein the one-bit variable has either a value of '0' indicating that no aperiodic CSI report is triggered, or a value of '1' indicating an aperiodic CSI report is triggered.

16. An apparatus for receiving Channel State Information (CSI) report in a wireless network where a plurality of cells is configured to cooperate for a User Equipment (UE) configured in transmission mode 10 with Carrier aggregation (CA), the apparatus comprising a processing circuitry configured to:

configure, via a higher layer, the UE whether to create a respective CSI report(s) for each aperiodic CSI process or not, using an information element including at least three one-bit variables, wherein the at least three one-bit variables include a trigger01-r11 corresponding, to a state '01' of a CSI request field, a trigger10-r11 corresponding to a state '10' of the CSI request field, and a trigger11-r11 corresponding to a state '11' of the CSI request field, and wherein the CSI request field is conveyed in a uplink DCI format that schedules a Physical Uplink Shared CHannel (PUSCH) for a serving cell.

17. The apparatus of claim 16, wherein the state '01' indicates that aperiodic CSI report is triggered for a set of CSI process(es) configured by the higher layer, the state '10' indicates that aperiodic CSI report is triggered for a first set of CSI process(es) configured by the higher layer, and the state '11' indicates that aperiodic CSI report is triggered for a second set of CSI process(es) configured by the higher layer.

18. The apparatus of claim 16, wherein the one-bit variable has either a value of '0' indicating that no aperiodic CSI report is triggered, or a value of '1' indicating an aperiodic CSI report is triggered.

19. An apparatus for transmitting Channel State Information (CSI) report in a wireless network where a plurality of cells is configured to cooperate for a User Equipment (UE) configured in transmission mode 10 with Carrier aggregation (CA), the UE comprising a processing circuitry configured to:

receive a configuration of a higher layer whether to create a respective CSI report(s) for each aperiodic CSI process or not, using an information element including at least three one-bit variables, wherein the at least three one-bit variables include a trigger01-r11 corresponding to a state '01' of a CSI request field, a trigger10-r11 corresponding to a state '10' of the CSI request field of, and a trigger11-r11 corresponding to a state '11' of the CSI request field, and wherein the CSI request field is conveyed in a uplink DCI format that schedules a Physical Uplink Shared CHannel (PUSCH) for a serving cell.

20. The apparatus of claim 19, wherein the state '01' indicates that aperiodic CSI report is triggered for a set of CSI process(es) configured by the higher layer, the state '10' indicates that aperiodic CSI report is triggered for a first set of CSI process(es) configured by the higher layer, and the state '11' indicates that aperiodic CSI report is triggered for a second set of CSI process(es) configured by the higher layer.

21. The apparatus of claim 19, wherein the one-bit variable has either a value of '0' indicating that no aperiodic CSI report is triggered, or a value of '1' indicating an aperiodic CSI report is triggered.

* * * * *